Sept. 1, 1959   M. S. PRESTON   2,901,914
REMOTE CONTROL ACTUATING DEVICES
Filed July 2, 1958   2 Sheets-Sheet 2

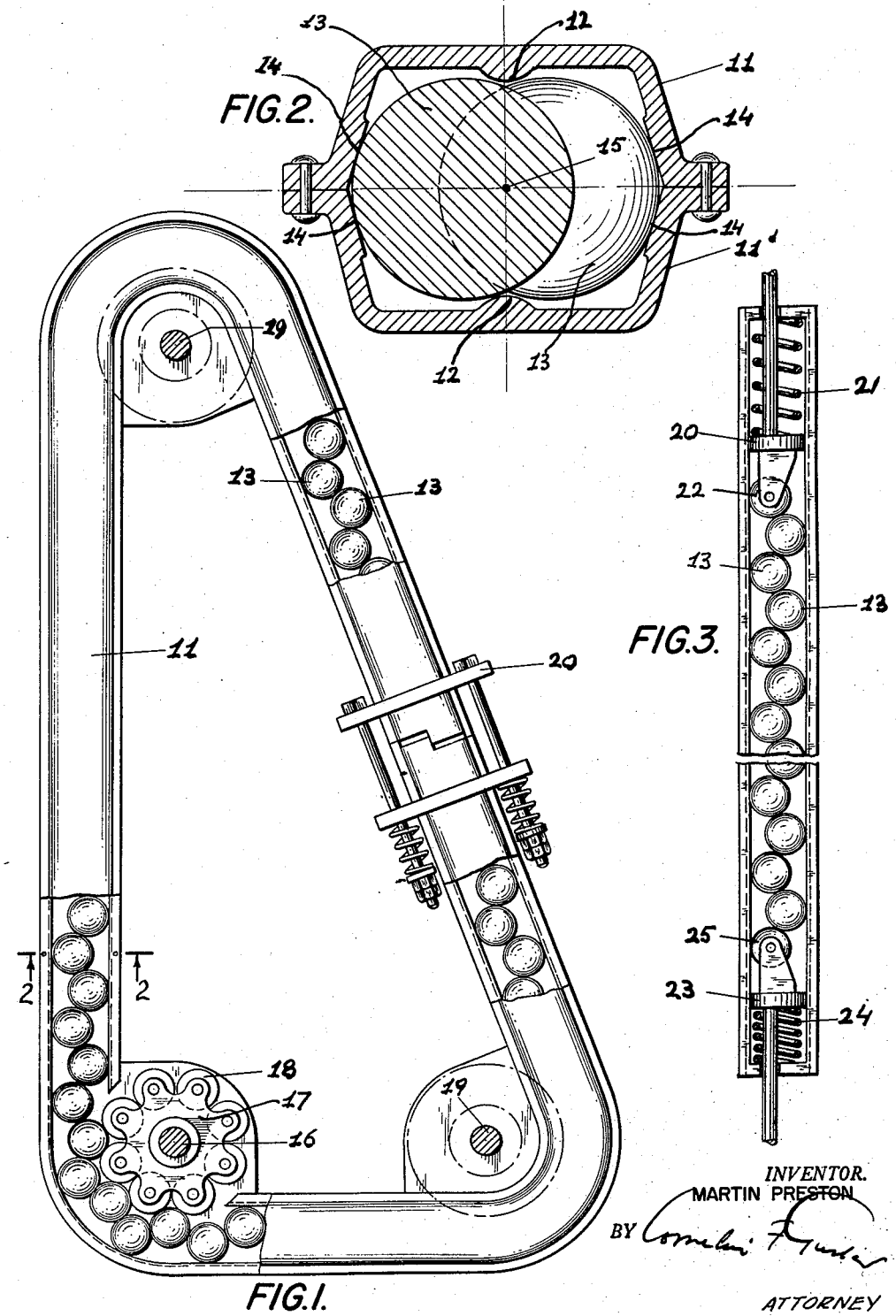

INVENTOR.
MARTIN PRESTON
BY
ATTORNEY.

United States Patent Office 2,901,914
Patented Sept. 1, 1959

2,901,914

REMOTE CONTROL ACTUATING DEVICES

Martin S. Preston, Oakland, Calif.

Application July 2, 1958, Serial No. 746,302

4 Claims. (Cl. 74—216.3)

This application is a continuation in part of my copending application filed on August 30th, 1956, Serial #607,020 now abandoned for an invention of the same title.

This invention relates to remote control devices, such as required by present day applications in aviation, automobile, marine, precision machinery and remote handling devices in the atomic energy and other industrial fields. Such control must be capable of transmitting the input force with a minimum of friction loss; it must transmit the input motion faithfully with minimum of backlash through a path which may be either a straight line or a combination of space curves; and it must be able to perform with uniform efficiency over long periods of time free of maintenance.

Although the invention is intended primarily for remote control purposes, that is, for the transmittal of motion involving only light forces, it may be used also for the transmission of power where intermittent or continuous imparting of rotary or reciprocating motions under comparatively heavy forces are desired.

Other purposes and novel features of the invention will be apparent from the following specification when considered in connection with the attached drawings in which:

Fig. 1 is a side view of a device embodying the invention with portions broken away for better illustration;

Fig. 2 is a cross section of Fig. 1 along the line 2—2;

Fig. 3 is a section of another device embodying the invention in a different form;

Like numerals refer to identical parts throughout all the drawings.

Figure 4:
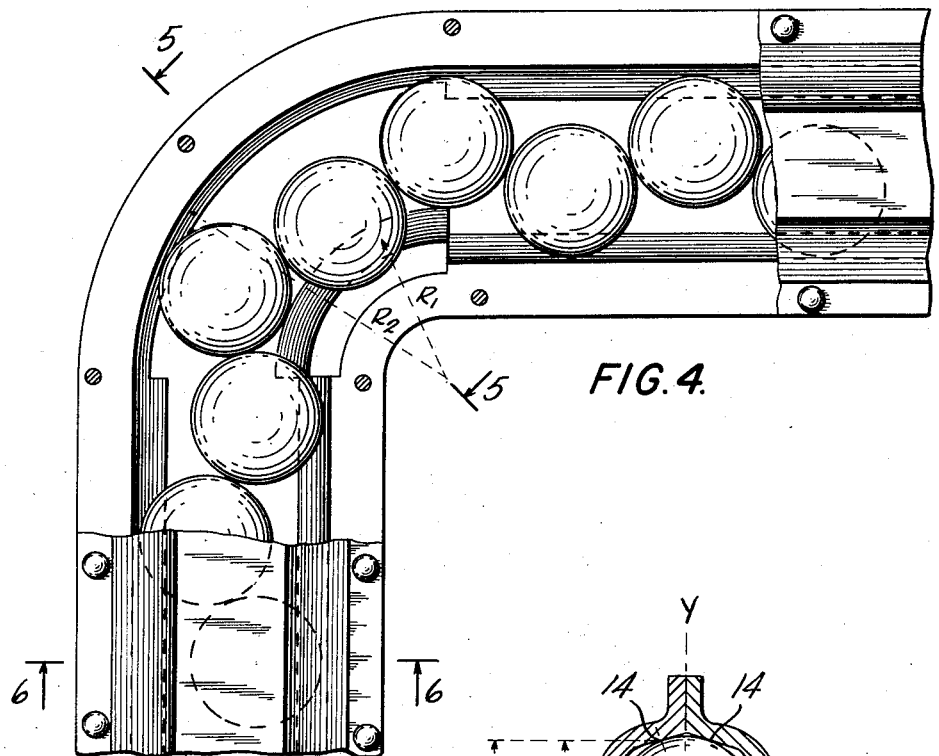
Fig. 4 is a section of a curved portion of the device.

As may be seen in Fig. 1 and Fig. 2, the invented device consists of a flattened tube 11 loaded with metallic balls 13. The tube may either be straight or its center line may follow any kind of space curve.

The balls 13 are arranged in two alternating rows within the tube, and to keep these alterating rows permanently separated, said tube 11 is provided with two dividing ridges 12 (Fig. 2).

In addition to being provided with the dividing ridges 12, the inside surface of said tube is so shaped as to provide two distinct contact surfaces for each row of balls so that each ball contacts the inside of the tube in two distinct points 14 in addition to having contact at points 15 with the adjacent balls in the opposite row. Consequently, each ball is supported at four points (twice at point 15) and twice at points 14, providing a stable equilibrium for every ball within the length of the tube.

It will appear that if the tightly packed balls are being pushed through the tube, their motion will take place without any sliding friction because at contact points 14 and 15 the surface of the balls 13 will roll, instead of gliding, against the contacted surfaces.

In a straight tube, the four contact points 14 must be located symmetrically about both axes of symmetry of the cross section of the tube (Fig. 2) in order to insure friction-free rolling contact between the balls themselves on one hand, and between balls and the contact surfaces on the other hand. This biaxial symmetry must always be maintained in a straight tube; and a curved tube, however, as shown in Fig. 4, the cross section of the tube will have symmetry only about the plane of curvature; i.e., only about axis Y—Y as it appears in Fig. 5. The projected distances $C_1$ and $C_2$ between contact points 14 and the ball centers must of necessity be proportional to the radii of the contact path curvatures $R_1$ and $R_2$; i.e., the geometric relationship of $C_1:C_2=R_1:R_2$ is a necessary condition for the friction-free motion of the balls.

Figure 5:
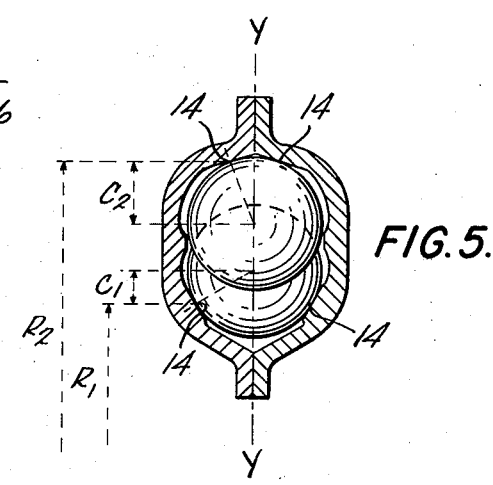
Fig. 5 is a section taken along lines 5—5 of Fig. 4.
Figure 6:
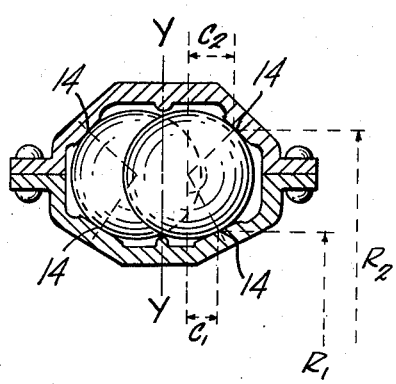
Fig. 6 is a section taken along lines 6—6 of Fig. 4.

If the plane of curvature is at right angles to that shown in Fig. 5, the cross section of the tube will be as shown in Fig. 6 for which the same above-defined geometric relationship holds.

The form of the invention shown in Fig. 1 is a closed system of balls 13 within a tube 11 which is provided with tightening means 20 keeping the entire system of balls tight. At selected points of the circuit a driving shaft 16 and one or more driven shafts 19 are in engagement with this alternating row of balls 13, said driving and driven shafts carrying sprocket 17 provided with rollers 18 being in continuous tight contact with balls 13. To further reduce friction, it is possible to mount the rollers 18 and possibly also the shafts 16 and 19 on anti-friction bearings.

It is obvious from this arrangement that any rotation of sprocket 17 will be transmitted without sliding friction and without backlash to the driven sprocket or sprockets.

The arrangement shown in Fig. 1 provides for the transmittal of rotary motion and involves a closed circuit of the ball carrying tube. However, to transmit straight line reciprocating motion, the system can be simplified by using only a single tube between the sending and receiving station as shown in Fig. 3, and by replacing the driving and driven sprockets 17 as shown in Fig. 3, by a driving piston 20 supported by spring 21 carrying a roller 22. Any push or pull of said piston 20 will be faithfully transferred to the actuated piston 23 similarly supported by spring 24 and carrying roller 25.

It should be understood that this single tube can follow any desired direction. It can comprise a combination of straight and curved paths as circumstances may require. The pistons 21 and 23 coact to perform their respective functions regardless of their individual relative alignment with each other.

Of course, changes in shape and arrangement of parts may be made, and other means of imparting rotary or push-pull motions and connecting the device to the actuated mechanism may be devised without departing from the spirit of the invention as described in the following claims:

I claim as my invention:

1. A remote control actuating device of the type described, consisting of a plurality of metallic balls contained in a tube, the inside surface of said tube being provided with at least one longitudinal ridge separating said balls into two alternating rows, part of said inside surface of said tube being so shaped as to provide two distinct longitudinal contact surfaces for each row of balls, said contact surfaces having biaxial symmetry in a straight portion of the tube while in a curved portion of the tube they are symmetrically arranged about the plane of curvature only and are at different distances from the transverse ball center lines, which distances are proportional to the radii of curvature of the respective contact paths and means to transmit input load to said balls and means to transmit output load from said balls.

2. A device as described in claim 1, provided with means to eliminate slack in the alternating rows of balls.

3. A device as described in claim 1, said means for transmitting loads to and from the said balls consisting of sprocket wheels provided with rollers.

4. A device as described in claim 1, said means for transmitting loads to and from said balls consisting of spring loaded pistons provided with rollers.

References Cited in the file of this patent

UNITED STATES PATENTS

| | | |
|---|---|---|
| 576,105 | Flindall | Feb. 2, 1897 |
| 618,642 | Clouser | Jan. 31, 1899 |
| 1,620,638 | Faller et al. | Mar. 15, 1927 |
| 2,160,308 | Edmonds | May 30, 1939 |
| 2,823,553 | Harrington | Feb. 18, 1958 |

FOREIGN PATENTS

| | | |
|---|---|---|
| 220,804 | Great Britain | Aug. 28, 1924 |